W. H. SPENCER.
AUTOMOBILE INDICATOR.
APPLICATION FILED AUG. 17, 1914.
1,163,788.
Patented Dec. 14, 1915.
2 SHEETS—SHEET 2.
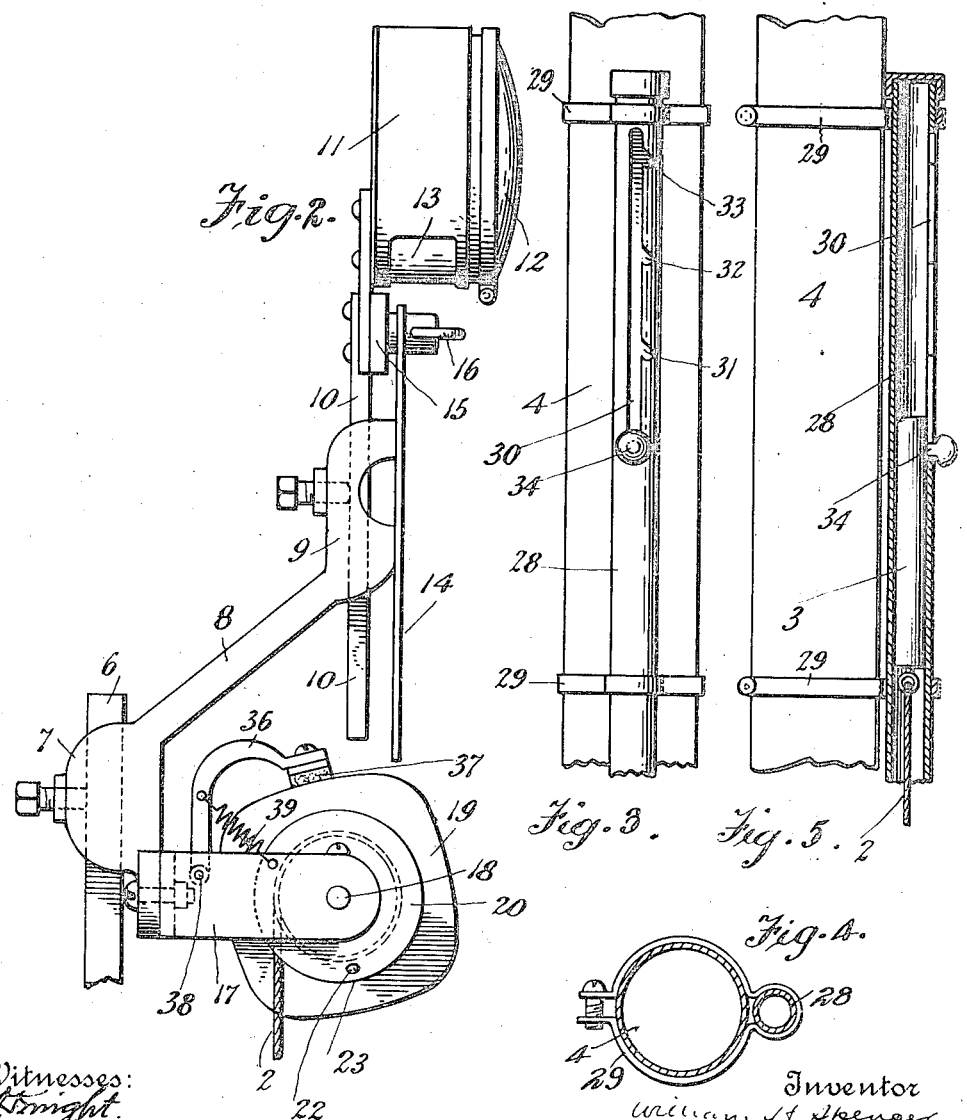

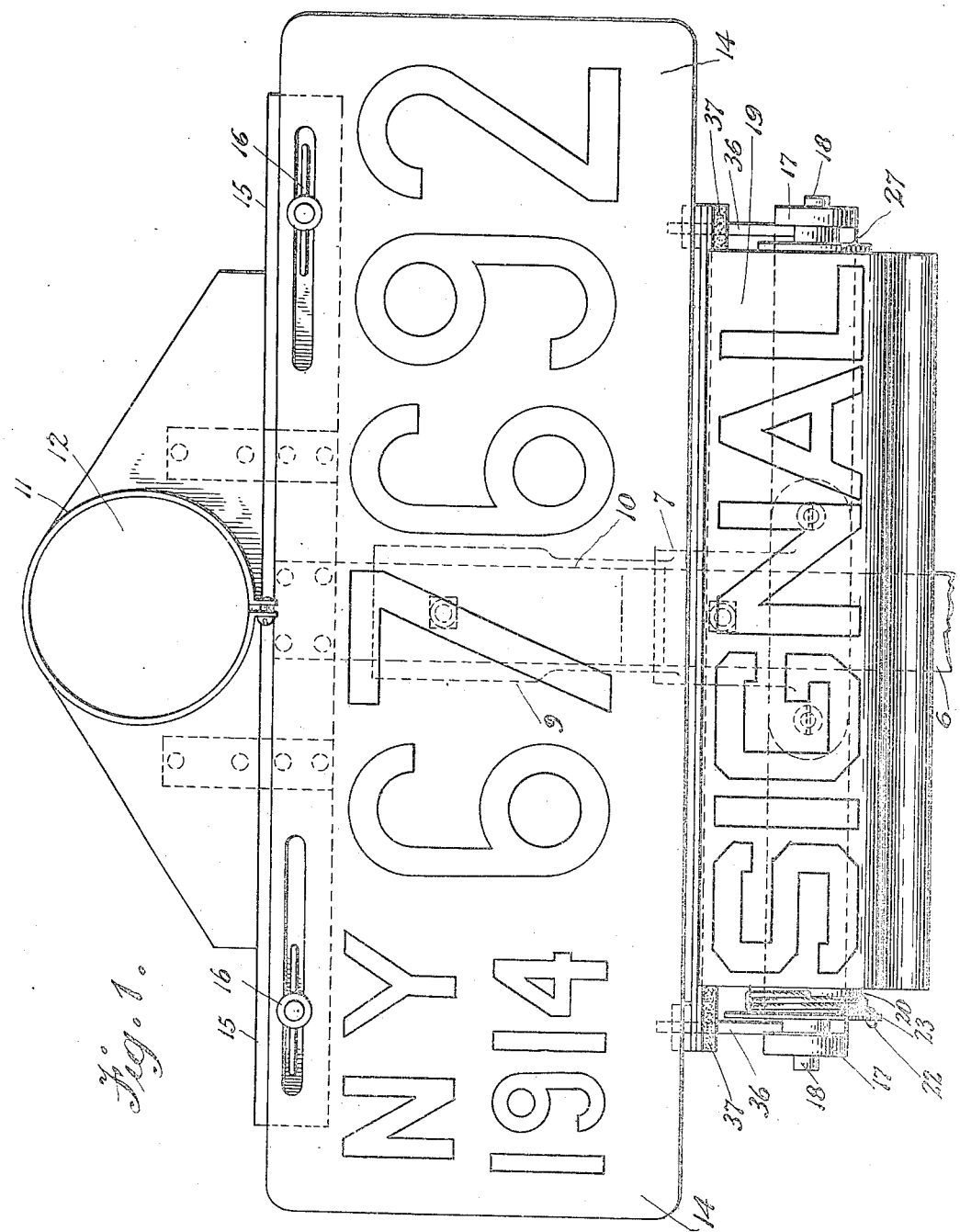

UNITED STATES PATENT OFFICE.

WILLIAM H. SPENCER, OF NEW YORK, N. Y., ASSIGNOR TO GEORGE FRANK SPENCER, OF NEW YORK, N. Y.

AUTOMOBILE-INDICATOR.

1,163,788. Specification of Letters Patent. Patented Dec. 14, 1915.

Application filed August 17, 1914. Serial No. 857,236.

*To all whom it may concern:*

Be it known that I, WILLIAM H. SPENCER, a citizen of the United States, and residing in the borough of Manhattan, city, county, and State of New York, have invented certain new and useful Improvements in Automobile-Indicators, of which the following is a full and clear specification.

This invention relates to automobile indicators, by means of which the intentions of an automobile driver may be signaled to others in the rear.

The primary object of this invention is to provide an improved device of this character which will be readily discernible at considerable distance, accessible to the driver of an automobile and which in a simple and efficient manner can be made to indicate any desired number of signals, such for example as Right, Left, Stop, etc.

One of the objects is to provide improved means for keeping the signal free of dust.

Other and further objects will appear in the specification and be pointed out in the appended claims, reference being had to the accompanying drawings, in which Figure 1 is a rear elevation of an automobile tail-light and license plate together with my improved indicator. Fig. 2 is a side elevation of the same; Fig. 3 is a fragmentary view in elevation of the steering post of the automobile showing the preferred indicator-controlling means. Fig. 4 is a transverse section of the same. Fig. 5 is a view similar to Fig. 3 but at right angles thereto, parts being broken away and parts shown in section; Fig. 6 is an axial section of the indicator drum in its preferred embodiment, parts being shown in elevation.

Referring more particularly to the drawings, the indicator 1 is connected by a flexible member 2 with a slide 3 which is reciprocably mounted on the steering post 4 of the automobile, said flexible member 2 being passed around the guide pulleys 5 which are disposed at suitable points.

Referring to Figs. 1 and 2, the upper end 6 of a fixed bracket or support is adapted to receive the socket end 7 of a bracket arm 8 which is vertically adjustable on the support 6. The bracket arm 8 is provided with an upper socket 9 within which is adjustably mounted the standard 10 which in the present embodiment serves to mount a tail-light 11 which is ordinarily employed with a colored lens 12 presented rearwardly. A transparent plate or lens 13 is provided in the bottom wall of the tail-light to illuminate the license sign 14 which is adjustably secured to a bar 15 by means of the thumb nuts 16. Projecting rearwardly from the socket end 7 of the bracket arm 8 is a yoke 17 within the branches of which is journaled a spindle 18. Said spindle 18 carries a flattened cylindrical drum or indicator 19 keyed thereto. The flattened walls of said drum or indicator are adapted to receive such legends as Right, Left, Stop, etc. In the normal, at rest position of the indicator, one of the flattened surfaces may be made to show the legend "Signal".

As shown in Fig. 2, the axis of rotation of the indicator is suitably disposed with respect to the tail-light 11 so that the illumination therefrom will fall upon whichever sign surface is at that time in position. For this purpose, means are provided for holding the indicator in any one or a plurality of signaling positions, with the sign surface at an angle as shown in Fig. 2. As shown in Figs. 1, 2 and 6, the indicator drum 19 has rigidly secured thereto a spool or drum 20 which is adapted to have a flexible member 2 wound thereon, one end of said flexible member being secured at 22 to the flange 23 of said spool or drum. Yieldable means for returning the drum to initial position after each release may be provided by a spring 24 which is coiled about the spindle 18, having one end secured to said spindle at 25 and the other end secured at 26 to a flange 27 which is rigidly secured to the other end of the drum. It will be seen therefore that whenever the flexible member 2 is drawn from the drum 20, the drum 19 will be rotated against the resistance of the spring 24. Suitable controlling means are preferably provided in the form shown in Figs. 3, 4 and 5 in which the steering post 4 carries a tube 28, said tube being mounted thereon by means of the bands 29. Said tube 28 is provided with the longitudinal slot 30. Along one edge of said slot said tube is provided with notches 31, 32 and 33 into which a radially projecting handle 34, which is carried by the slide 3, is adapted to fit. The free end of the flexible member or cable 21 is secured to one end of the slide 3.

A pair of spaced arms 36 serve to carry a wiper 37 which contacts with the sign bearing surfaces as the indicator 19 is rotated on its axis. Said arms are pivoted at 38 in the bracket arms 17 and under the action of springs 39 serve to press the wiper against the indicator.

The operation is as follows: Normally the radial handle 32 rests at the bottom end 35 of the slot 30, the word "Signal" being presented rearwardly as indicated on Fig. 1. Whenever said handle 32 is elevated by the power driver and displaced laterally into one of the notches 31, 32 or 33, one of the other sign-bearing surfaces of the indicator drum will be revolved into position to indicate Right, Left, Stop, etc., according to the intention of the car driver. When sufficient time has elapsed to render the signal thus given of no further use the handle 32 may be rotated in the opposite direction when the spring within the drum 19 will cause it to be drawn to the bottom end 35 of the slot 30.

What I claim is:

1. In an automobile, the combination with a fixed support having spaced branches, of an indicator journaled at opposite ends in said branches, means for rotating said indicator, a wiper for said indicator, and arms movably mounted on the branches of said support, said wiper having its ends secured to said arms, and means yieldably pressing said wiper against the peripheral surface of said indicator.

2. The combination with a support provided with spaced branches, of an indicator journaled at opposite ends in said branches, means for rotating said indicators, a wiper extending parallel to the axis of said indicator, said wiper being movably mounted on said support, and means yieldably pressing said wiper against the peripheral surface of said indicator to clean its sign-bearing surface while said indicator is being rotated, said wiper being provided with spaced supporting arms pivoted to said branches respectively.

WILLIAM H. SPENCER.

Witnesses:
W. H. RICKETTS,
ALEX. C. MATTESON.